April 18, 1950        A. VERHOEFF        2,504,362

ELECTRON RAY TUBE FOR PHOTOGRAPHING ELECTRON-IMAGES

Filed Aug. 6, 1947        2 Sheets-Sheet 1

ADRIANUS VERHOEFF.
INVENTOR.

BY

AGENT.

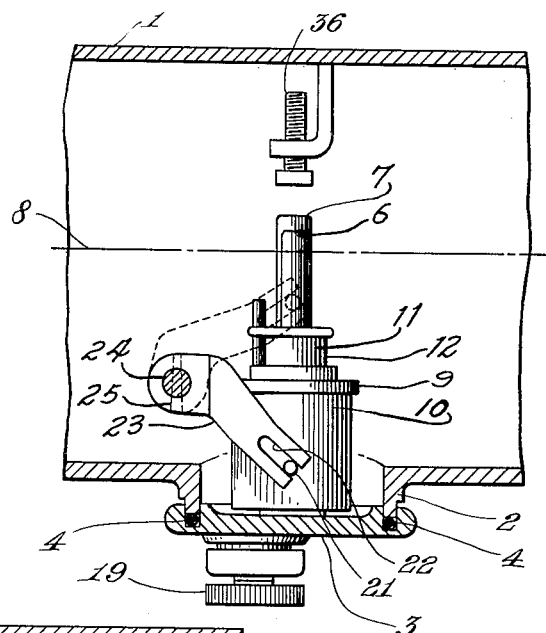
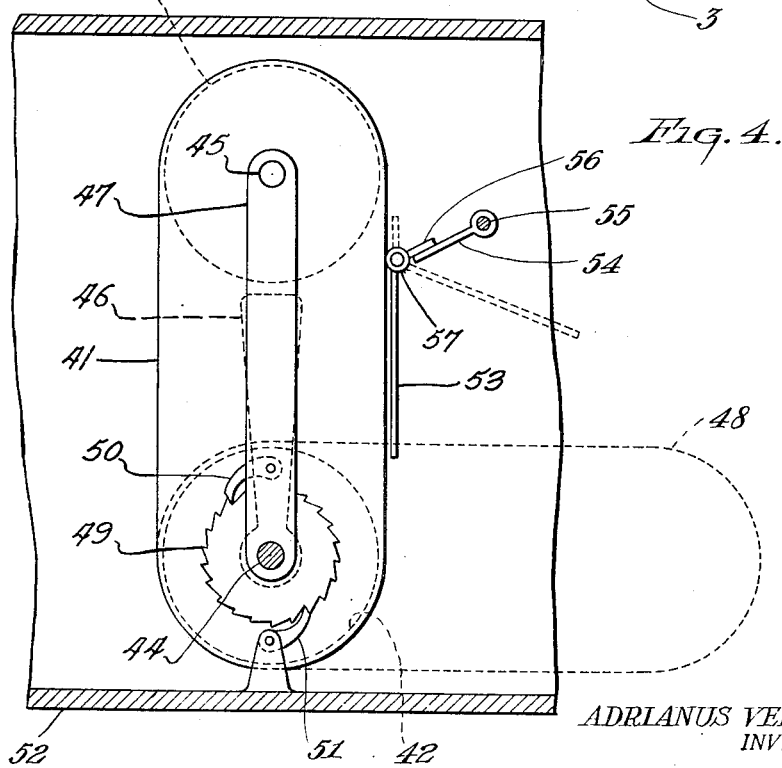

Patented Apr. 18, 1950

2,504,362

UNITED STATES PATENT OFFICE 2,504,362

ELECTRON RAY TUBE FOR PHOTOGRAPH-
ING ELECTRON IMAGES

Adrianus Verhoeff, Eindhoven, Netherlands, assignor to Hartford National Bank and Trust Company, Hartford, Conn., as trustee Application August 6, 1947, Serial No. 766,835
In the Netherlands August 30, 1946

7 Claims. (Cl. 250—49.5)

In electron-ray tube technique it is in many cases desirable, for example in the case of electron microscopes, that the electron image should be photographed. It is advantageous in this case to cause the electrons to react directly on the film, since then much shorter times of exposure suffice for obtaining a determined blackening than in photographing the luminescent image. For this purpose the film is required to be introduced into the vacuous space.

In most cases direct observation will also be required of a fluorescent image produced by the same beam as that by which the photograph is taken, if only to ensure sharp focusing of the image.

A disadvantage is that the electron-ray tube is required to be opened and exhausted again before and after each exposure. It is possible to contrive devices in which the film may be led inwardly through a slit provided in the wall of the tube, but even in this case it is unavoidable that air penetrates into the discharge vessel, for the exhaustion of which an exhaust installation of fairly high capacity is required.

Consequently, it has been found to be desirable to arrange in the vacuous space a camera which is adapted to accommodate a supply of film material sufficient for a plurality of exposures. In order to prevent air from penetrating into the discharge vessel on changing the image surfaces, the mechanism provided for this purpose must be capable of being operated from outside of the tube.

As a rule, it is necessary to make a large number of exposures for one investigation. Consequently, it is not objectionable at all that the exposed image surface cannot be removed after a single exposure without removing the whole of the film from the tube. It seldom occurs after completion of the photographic exposure that any appreciable length of unexposed film remains.

In electron microscopes of known type in which such a camera is housed in the vacuous space of the tube, it is arranged behind the fluorescent screen. When the observation of the directly-visible image is finished and a photographic exposure must start, the said screen may be collapsed and be moved again into the beam of rays whenever it is desired to see the fluorescent image again.

The present invention retains the advantage of a camera adapted to accommodate a supply of film material, it being possible to ensure advantages which do not exist in devices of this kind hitherto known.

The electron-ray tube according to the invention comprises a mechanism for removing the camera, or the film in the camera, from the space occupied by the electron ray and moving it back therein again. The means for operating this mechanism are provided on the outside of the tube.

According to the invention, a further improvement is obtained by coupling this mechanism to the mechanism for image changing in such manner that the latter operation takes place as a result of the movement of the film out of and into the space circumscribed by the electron ray.

In a thermionic tube constructed on this principle the camera may comprise a film magazine containing two film reels, one of which, intended to take up the exposed portion of a film, is wound and the other, containing the portion of the film that is still to be exposed, is at the same time unwound and in which a displacement of the film magazine with respect to the electron beam has the effect of turning the reels and moving the film over a distance equal to at least the height of the image surface to be exposed, as measured in the direction of movement.

This electron tube may be equipped with a film magazine which is capable of being tilted about the spindle of one of the reels, this reel being coupled, by means of a free-wheel device, to the film magazine and to a stationary part in such manner that the reel is adapted to turn with respect to both, but in one and the same direction. Consequently, upon rotation of the film magazine in one direction, the movement is followed by the reel and upon rotation in the other direction, the movement does not affect the reel, the latter being checked by the stationary part. It is therefor, of course, essential that the angle, measured in radians, through which the film magazine is tilted, multiplied by the radius of the film reel, is equal to at least the height of one image surface. This product will vary somewhat as the film is unwound, for the value of the effective radius must be taken as the value corresponding to the inner most turn. A similar rule must be observed with an ordinary optical camera working with a rolled film.

In a further form of the electron-ray tube according to the invention, which is based on the same principle, the film magazine is adapted to move forward and backward in the direction of the axes of the reels, the reels being guided during this movement so as to perform a rotation sufficient to move the film over a distance equal to the height of one film image. This automatic film feed simplifies the operation of the camera and avoids spoiled exposures, which would arise if the operator should fail to change the image surfaces.

In the two above-described examples a gate may be provided in the wall of the film magazine, which is perfectly light-tight, opposite the place of exposure, hence between the two reels, said gate being adapted to be closed or opened by a shutter operated from without.

In one most advantageous form of the electron-ray tube according to the invention, the reel containing the exposed portion of the film, hence the take-up reel, is slidable on a rod provided with a helical slot in which a cam engages, or with a helical upright edge which engages in a notch, the cam or the notch being provided in a cylinder which is adapted to rotate about the rod and which is coupled to the reel by means of a free-wheel device, thus driving the reel in only one direction of rotation.

The said free-wheel device is not required, if the rod comprises two helical slots which extend in opposite senses and merge into one another at their extremities, so that the film reel, which is driven by a cam engaging in the slots, is turned in the same direction with the forward and backward stroke and this in each case to a sufficient extent to the film over a distance equal to half the height of the image surface. A similar device for converting a reciprocating movement into a rotary motion is utilized in drilling machines.

The movement may in either case be performed in a very simple manner by means of a crank provided in the discharge vessel and the shaft of which extends through the wall of the vessel. An operating knob or handle may be secured to the said shaft at the outside of the camera. The free extremity of the crank is required to engage the film magazine so as to displace the latter, during its movement, in the direction of the axes of the reels.

A further method of moving the film temporarily outside the reach of the electron ray consists in rotatably mounting the camera on a shaft which crosses or intersects the two axes of the reels at right angles and is located at the side of the film. For coupling the film feed mechanism use may be made in this case of one of the known means for coupling two shafts which are at right angles to one another.

The invention will be explained more fully by reference to the accompanying drawing showing that portion of two examples of a thermionic tube according to the invention which comprises the film magazine.

Fig. 3 relates to a similar example and is an elevation view of the film magazine.

Fig. 4 shows an example in which the film magazine is collapsible about the spindle of one of the reels.

Figure 1:
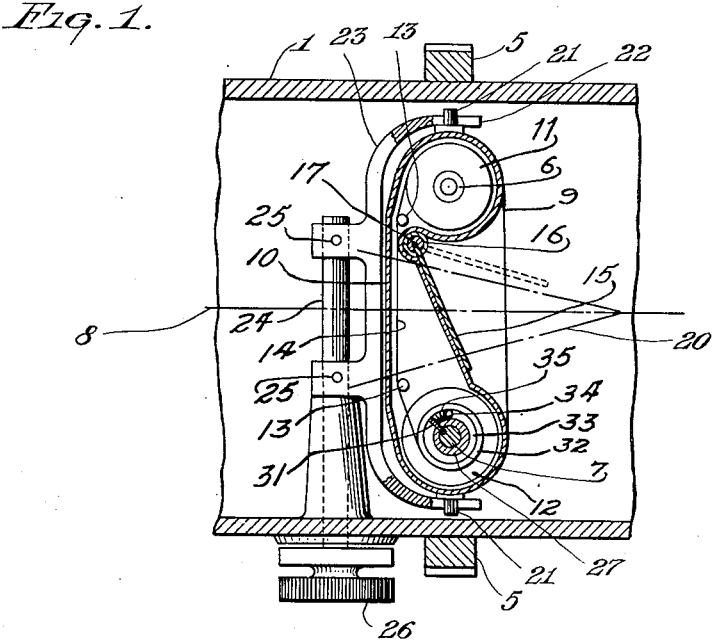
Fig. 1 is a sectional view of the film magazine, according to a plane normal to the axes of the reels, in a tube in which the film magazine comprises film reels movable in the direction of their axes.
Figure 2:
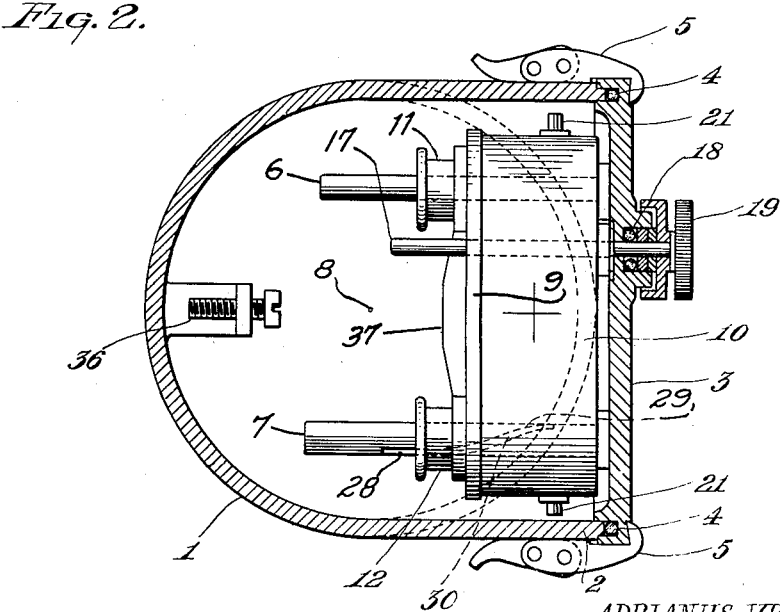
Fig. 2 is a sectional view of a similar tube according to a plane normal to the axis of the tube and hence parallel to the axes of the reels, the figure showing the film magazine such as observed when looking at the source of rays in the direction of the axis of the tube.
Figure 2:

In Figs. 1, 2 and 3, reference numeral 1 designates the wall of a metallic portion of the discharge tube through which, coming from the right-hand side in Fig. 1, falls a beam of electrons. The tube may be, for example, an electron microscope, but the invention is also applicable to other electron-ray tubes, for example to tubes for oscillography. In an electron microscope there is produced an electron beam covering the whole of the image surface or a large portion thereof and the intensity of which beam in a plane normal to the axis varies from point to point with the brightness of the image to be transmitted. In a tube for oscillography, a narrow electron ray moves, with or without modulated electron density, through the space intended for the formation of the image.

The cylindrical metal portion 1 exhibits a side-wall 2 which is closed hermetically by means of a cover 3. The air-tightness is ensured by an inlaid rim 4 of flexible material such as rubber. The cover may be closed easily and tightly by means of claw hooks 5. The cover has secured to it two rods 6 and 7, which intersect at right angles with axis 8 of the tube and on which rods a film camera is adapted to slide forward and backward.

The camera comprises a base 9 which constitutes, together with a hood 10, a magazine closed on all sides. Rod 6 is surrounded by a film reel 11 comprising the unwinding portion of the film and rod 7 is surrounded by a film reel 12 comprising the winding portion of the film. Between these reels the film is guided by a pair of guide rollers 13, the image surface 14 being provided on the straight portion of the film.

The hood exhibits at the center an inclined depression comprising a film gate which is closed by a shutter 15 which is secured in a sleeve 16 loosely provided on a pin 17. The latter exhibits a groove into which there extends the edge of the shutter through a slot provided in the sleeve 16. Consequently, when pin 17 is rotated, the sleeve 16 and the shutter 15 follow this movement, but the sleeve and the shutter are slidable on the pin in the axial direction. Pin 17 extends hermetically through the wall 1, a stuffing-box 18 serving for the obturation. The extremity of pin 17 projecting beyond the cover 3 exhibits a knob 19 which permits of turning the pin, which consequently allows the shutter 15 to be closed at will or opened to such extent as to lie clear of the space 20, which is occupied by the electron ray, as indicated by dotted lines in Fig. 1.

The hood 10 exhibits, at the top and at the bottom, pivots 21, which are provided in slots 22 of a double crank 23, which is secured to a shaft 24 by means of conical pins 25. The shaft extends through the wall 1 to the exterior and carries at its end a knob 26, enabling the shaft to be turned. For hermetic obturation a similar stuffing-box is provided as with pin 17.

Turning the knob 26 permits of moving the crank 23 forward and backward, the latter thus driving the magazine which is guided by the rods 6 and 7 on which the reels 11 and 12 are adapted to slide. It is thus possible to move the magazine into the cone of rays 20 or to push it away outside the reach of the electron beam.

Inside the film reel 12, a sleeve 27 surrounds slightly eccentrically the rod 7 which exhibits a slot formed by two axial portions 28 and 29 and a helical portion 30. A cam 31 provided on the sleeve 27 engages this slot. Owing to the eccentric arrangement, the said sleeve 27 and a cylinder 32 enclose a space 33 which is wider at one side than at the other. This can be clearly seen from Figure 1. The said space contains a pawl in the form of a ball 34. When the magazine is moved from the right to the left as viewed in Fig. 2, the cam 31 performs a rotary motion which, as viewed in Figure 1, is anti-clockwise. The eccentric sleeve 27 is in this case driven in the same direction of rotation so that the pawl 34 is clamped between the sleeve 27 and the cylinder 32 and the spool 12 also follows this movement. Consequently, the film is wound on the spool 12 and at the same time unwound from spool 11 with the result that a new image surface is brought in front of the shutter 15.

If, after the exposure has been made and the shutter 15 is closed again, the film magazine is restored, by means of the knob 26 and the crank 23, to the position in which it is shown in Figure 2 (in which figure the crank 23 is omitted for the sake of clearness) the cam 31, guided by the slot 30, moves back and hence now in the clockwise direction. During this movement the ball 34 is unaffected so that the film reel 12 is not coupled to the sleeve 27 and no film movement takes place. In order to ensure that the ball is clamped immediately upon the first-mentioned movement, provision is made of a spring 35 which pushes the ball towards the narrowest portion of the intermediate space.

On the wall of the tube is provided an adjustable abutment which determines the distance over which the film magazine is movable. A screw 36 permits of adjusting this distance so that, when the surface 37 of the plate 9 engages the head of the screw 36, the centre of the film exactly lies in the axis of the tube.

When the film magazine is moved out of the beam of rays, the rays can pass unhampered and be intercepted by a fluorescent screen, which is not shown in the drawing but which must be imagined in Figure 1 to be arranged at the left of the film magazine. On this fluorescent screen there may be produced a visible image which may serve to ascertain if the image is sharply focused and to study the electron image before taking a photograph.

Only when the whole of the film, which may comprise for example as many as 100 images, has been exposed, need the cover 3 be opened. This may take place in full daylight since the camera is closed in a light-tight manner. During the film movement and the forward and backward movement of the film magazine there is no penetration of air of any appreciable extent into the discharge vessel so that the vacuum may be maintained at the desired level by an exhaust installation of low capacity.

Figure 4 shows diagrammatically a further example in which the film camera, instead of being moved in a straight line, is rotated. The film magazine 41 is designed in a similar manner as in the previous example and contains two film reels 42 and 43 which are loosely mounted on their spindles 44 and 45. The magazine 41 is rotatable about the spindle 44 of film reel 42. The spindle 44 extends to the interior through the wall of the discharge vessel and comprises at the extremity a handle 46, which is indicated by dotted lines. The spindles 44 and 45 are coupled together by means of a rod 47. Consequently, when the handle 46 is operated, the spindle 44 is turned and the rod 47, together with the whole of the film magazine, is tilted to occupy the position indicated by a dotted line 48.

On the spool 42 is provided a ratchet wheel 49 which is engaged by a pawl 50 which is rotatably secured to the film magazine or to the rod 47, the engagement being such that, when the magazine is turned to the left, the pawl 50 causes the ratchet wheel 49 to follow this movement. On the other hand, when the magazine is turned to the right, the pawl 50 slides over the teeth of the wheel 49. Upon this latter movement a pawl 51, which is rotatably secured to a stationary part, viz. the wall 52 of the tube, engages with the teeth of the wheel 49 and prevents the latter from following the movement due to friction. In this case the film is wound over a quarter of the periphery of the film spool 42 and is moved over this distance along the wall of the film magazine. The said distance must be equal to at least the height of one film image, hence to the diameter of the electron beam passed through a gate, as measured in the direction of movement.

For opening the shutter 53, provision is made of a crank 54 which is secured to a spindle 55, extending through the wall of the discharge vessel. Rotation of spindle 55 permits this crank to be urged against a lever 56 which projects laterally beyond the film magazine, that is to say forwards in the figure, and which is secured to the shutter 53, which is pivoted on a spindle 57. When the crank 54 is turned further, it releases the lever 56 whereupon the shutter is closed under the action of its own weight and of the force of a spring required to keep it closed also when the magazine is collapsed.

In this device also the camera may be moved wholly out of the beam of rays so that the beam may fall upon a fluorescent screen arranged behind the camera, the film movement being effected by moving the camera into and out of the beam so that spoiled exposures are avoided. A large number of photographs may be taken before it is necessary to interrupt the work for removing the film from the vacuous space, for which purpose the discharge tube must, of course, be opened and air admitted to the tube. However, on changing the image surfaces between two consecutive exposures there is no penetration of air into the vessel if the construction for the air-tight passage of the spindle 44 through the wall is carried out with sufficient care. For this purpose a similar stuffing-box may be used as that suggested with 18 in Figure 2, as well as for the shaft 55 of the device intended for operating the shutter 53.

What I claim is:

1. In an electron ray tube having a fluorescent screen, an envelope having a wall portion and a source of an electron beam directed along a given path within the envelope, camera apparatus for recording variations of said beam, comprising a wall member serving as a cover for an aperture in said envelope and having an inner surface exposed to the interior of said envelope, supply means for a plurality of film elements mounted on the inner surface of said wall member, means passing through said wall portion to position said film elements in the said path and outside of the said path selectively, and means coupled to said positioning means to consecutively place said film elements in operating position.

2. In an electron ray tube having a fluorescent screen, an envelope having a wall portion and a source of an electron beam directed along a given path within the envelope, camera apparatus for recording variations of said beam, comprising a wall member serving as a cover for an aperture in said envelope and having an inner surface exposed to the interior of said envelope, a supply spool for a continuous film band and a take-up spool, said spools being supported on the inner surface of said wall member, means passing through said wall portion to position said film band in the said path and outside of the said path selectively, and means coupled to said positioning means to consecutively transfer portions of said film band from the supply spool to the take-up spool.

3. In an electron ray tube having a fluorescent screen, an envelope having a wall portion and a source of an electron beam directed along a given path within the envelope, camera apparatus for recording variations of said beam, comprising a wall member serving as a cover for an aperture in said envelope and having an inner surface exposed to the interior of said envelope, a rotatable spindle member passing through said wall member and extending from the inner and outer surfaces thereof, a take-up spool mounted on the inner portion of said spindle member, a supply spool for a continuous film band, a frame member securing said spools in spaced relationship, said frame member being rotatable about the axis of said spindle member to position said film band in the said path and outside of the said path selectively, and means coupled to the inner portion of said spindle member to consecutively transfer portions of said film band from the supply spool to the take-up spool.

4. In an electron ray tube having a fluorescent screen, an envelope having a wall portion and a source of an electron beam directed along a given path within the envelope, camera apparatus for recording variations of said beam, comprising a wall member serving as a cover for an aperture in said envelope and having an inner surface exposed to the interior of said envelope, first and second spindle members secured to and projecting from the inner side of said wall member in spaced relationship and arranged with their axes substantially perpendicular to said path, a supply spool for a continuous film band mounted on said first spindle and a take up spool mounted on said second spindle member, a frame member having portions thereof abutting the ends of said spools, means to reciprocate said spools longitudinally of the axis of said spindles to position said film band in the said path and outside of the said path selectively comprising a member passing through said wall portion and engaging said frame member, and means interposed between said take-up spool and said second spindle to consecutively transfer portions of said film band from the supply spool to the take-up spool upon reciprocation of said spools.

5. In an electron ray tube having a fluorescent screen, an envelope having a wall portion and a source of an electron beam directed along a given path within the envelope, camera apparatus for recording variations of said beam, comprising a wall member serving as a cover for an aperture in said envelope and having an inner surface exposed to the interior of said envelope, first and second spindle members projecting from the inner side of said wall member in spaced relationship and arranged with their axes substantially perpendicular to said path, said second spindle member being fixedly secured to said wall member, a supply spool for a continuous film band mounted on said first spindle and a take up spool mounted on said second spindle member, a frame member having portions thereof abutting the ends of said spools, means to reciprocate said spools longitudinally of the axes of said spindles to position said film band in the said path and outside of the said path selectively comprising a member passing through said wall portion and engaging said frame member, and means comprising a helical member interposed between said second spindle member and said take-up spool to rotate said take-up spool upon reciprocating movement thereof to consecutively transfer portions of said film band from the supply spool to the take-up spool.

6. In an electron ray tube having a fluorescent screen, an envelope having a wall portion and a source of an electron beam directed along a given path within the envelope, camera apparatus for recording variations of said beam, comprising a wall member serving as a cover for an aperture in said envelope and having an inner surface exposed to the interior of said envelope, first and second spindle members projecting from the inner side of said wall member in spaced relationship and arranged with their axes substantially perpendicular to said path, said second spindle member being fixedly secured to said wall member and being provided with two helical slots joined at their end portion and having opposite senses of rotation, a supply spool for a continuous film band mounted on said first spindle and a take-up spool mounted on said second spindle member, a frame member having portions thereof abutting the ends of said spools, means to reciprocate said spools longitudinally of the axes of said spindles to position said film band in the said path and outside of the said path selectively comprising a member passing through said wall portion and engaging said frame member, and means comprising a cam member engaging said helical slots to rotate said take-up spool upon reciprocating movement thereof to consecutively transfer portions of said film band from the supply spool to the take-up spool.

7. In an electron ray tube having a fluorescent screen, an envelope having a wall portion and a source of an electron beam directed along a given path within the envelope, camera apparatus for recording variations of said beam, comprising a wall member serving as a cover for an aperture in said envelope and having an inner surface exposed to the interior of said envelope, a frame member defining an enclosure for a plurality of film elements mounted on the inner surface of said wall member, said frame member being provided with an opening exposing said film elements to said electron beam, a shutter closing said opening, means passing through said wall portion to position said enclosure and the therein contained film elements in the said path and outside of the said path selectively, means coupled to said positioning means to consecutively place said film elements in operating position, and means passing through said wall member to open said shutter.

ADRIANUS VERHOEFF.

REFERENCES CITED

The following references are of record in the file of this patent:

UNITED STATES PATENTS

| Number | Name | Date |
| --- | --- | --- |
| 2,185,373 | George | Jan. 2, 1940 |
| 2,200,095 | Marton | May 7, 1940 |
| 2,275,235 | Ruedy | Mar. 3, 1942 |